May 8, 1923.

F. H. PARADICE

HOSE MENDER, BAND, AND COUPLING

Filed Oct. 9, 1922

1,454,073

Frank H. Paradice

INVENTOR.

Patented May 8, 1923.

1,454,073

UNITED STATES PATENT OFFICE.

FRANK H. PARADICE, OF DENVER, COLORADO.

HOSE MENDER, BAND, AND COUPLING.

Application filed October 9, 1922. Serial No. 593,409.

*To all whom it may concern:*

Be it known that I, FRANK H. PARADICE, a citizen of the United States, residing at Denver, in the county of Denver and State of Colorado, have invented new and useful Improvements in Hose Menders, Bands, and Couplings, of which the following is a specification.

My invention relates to improvements in hose menders, hose bands, and hose couplings which may be fastened to the hose without any locking device and which only require to be hammered to fasten them; this improvement differs from my copending application as it is a one piece article, that is, the mender is in one piece, the hose coupling or rather the tail piece of the hose coupling with its band forms one piece.

Similar numerals refer to similar parts throughout the several views.

In the accompanying drawing—

Figure 1:
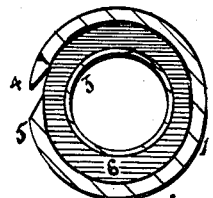
Fig. 1 is a cross section of the hose mender, showing the face of a compressible ring between the inner tube and the hose band.
Figure 2:
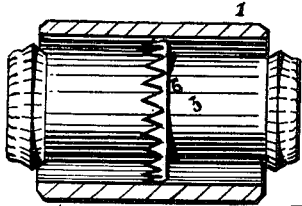
Fig. 2 is a side view of the same, the hose band being in longitudinal section.
Figure 3:
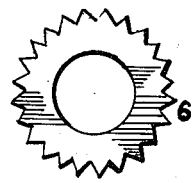
Fig. 3 is a view of the metal compressible ring, flat, that is before it is formed up to be inserted into the hose mender.
Figure 4:
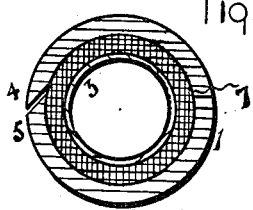
Fig. 4 is a cross sectional view of the hose mender, showing a compressible ring made of felt, rubber, or suitable compressible fabric.
Figure 5:
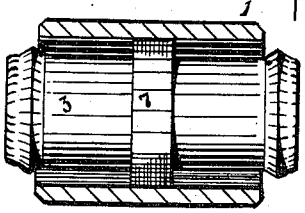
Fig. 5 is a side view of same showing the fabric ring.
Figure 6:
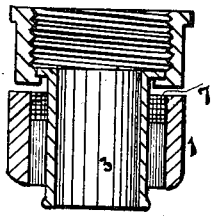
Fig. 6 is a sectional view of a hose coupling, showing the hose band and the fabric ring.
Figure 7:
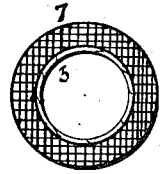
Fig. 7 is a cross section of the inner tube and showing the fabric ring for use with the hose coupling.

6 is the metal compressible ring, 7 is the outside compressible fabric ring. 1 is the inner tube or hose band. 3 is the inner tube. 4 is one edge of the split tube. 5 is the other edge of same.

The metal compressible ring 6 is to be turned up to fit the inner tube tightly and then pressed into the hose band in its open condition, thus forming a hose mender of one article. A compressible ring 7 made of felt, rubber, or fabric may be substituted for the metal ring 6. When the hose band is hammered down to grip the hose to be mended, the yielding of the ring permits the hose band to close tightly around the hose. The ring offers no resistance to the effective gripping of the hose band.

The outer band and the inner tube when held together by the compressible ring make a mender of one piece.

I claim—

1. In a hose mender, the combination of an inner tube, and an outer bendable longitudinally split band, without locking device said inner tube and outer band held together by a compressible ring between the two substantially as described.

2. In a hose coupling the combination of an internal sleeve having duplicate ends and an external yielding, longitudinally split sleeve, secured to said internal sleeve by means of a compressible gasket, which gasket is compressed upon clamping to position of the external sleeve.

FRANK H. PARADICE.